United States Patent
Kaishian et al.

(10) Patent No.: US 10,069,259 B2
(45) Date of Patent: *Sep. 4, 2018

(54) MULTI-DRIVE COMMON CONTROL BUS CONNECTOR SYSTEM

(71) Applicant: Rockwell Automation Technologies, Inc., Mayfield Heights, OH (US)

(72) Inventors: Steven Kaishian, Wauwatosa, WI (US); Jeremy Keegan, Kewaskum, WI (US); Yogesh Popatlal Patel, Grafton, WI (US); Bruce W. Weiss, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,994

(22) Filed: Jan. 30, 2017

(65) Prior Publication Data

US 2017/0141524 A1 May 18, 2017

Related U.S. Application Data

(63) Continuation of application No. 13/965,766, filed on Aug. 13, 2013, now Pat. No. 9,558,864.

(Continued)

(51) Int. Cl.
*H02G 5/00* (2006.01)
*H01R 25/14* (2006.01)
(Continued)

(52) U.S. Cl.
CPC .......... *H01R 25/142* (2013.01); *H01R 13/50* (2013.01); *H01R 13/62933* (2013.01); *H02G 5/025* (2013.01); *H01R 2107/00* (2013.01)

(58) Field of Classification Search
CPC ............ H01R 25/142; H01R 13/50; H01R 13/62933; H01R 2107/00; H02G 5/025

(Continued)

(56) References Cited

U.S. PATENT DOCUMENTS 3,922,053 A * 11/1975 Hafer ...................... H02G 5/08
174/68.2
5,162,616 A * 11/1992 Swaffield ............... H01R 25/14
174/70 B (Continued)

FOREIGN PATENT DOCUMENTS

DE 34 37 586 A1 4/1986
EP 1 750 342 A1 2/2007

OTHER PUBLICATIONS

Siemens Sinamics S120 paper titled "*DC Bus and 24V Rails*" dated Mar. 22, 2012 (1 page).

(Continued)

*Primary Examiner* — Steven T Sawyer
(74) *Attorney, Agent, or Firm* — Fay Sharpe LLP

(57) ABSTRACT

An electrical bus assembly includes a frame and a plurality of bus bar carriers connected to the frame. The bus bars are supported by the bus bar carriers in parallel spaced-apart relation. A first retainer cap is secured to a first one of the plurality of bus bar carriers located adjacent a first end of the frame. A second retainer cap is secured to a second one of the plurality of bus bar carriers located adjacent a second end of the frame. The first and second retainer caps limit axial movement of the bus bars relative to the plurality of carriers sufficiently to prevent escape of the bus bars from the carriers. A bus bar connector is also disclosed for supplying power to or from the bus bars. An electrical bus system includes a first and second bus bar assemblies and a jumper connector assembly.

12 Claims, 8 Drawing Sheets

Related U.S. Application Data

(60) Provisional application No. 61/683,197, filed on Aug. 14, 2012.

(51) Int. Cl.
*H01R 13/50* (2006.01)
*H01R 13/629* (2006.01)
*H02G 5/02* (2006.01)
*H01R 107/00* (2006.01)

(58) Field of Classification Search
USPC .......................................... 439/212; 174/99 B
See application file for complete search history.

(56) References Cited

U.S. PATENT DOCUMENTS

| | | | |
|---|---|---|---|
| 5,938,461 A * | 8/1999 | Biermeier | H02G 5/08 439/212 |
| 7,655,865 B2 | 2/2010 | Wagener | |
| 2007/0102184 A1 | 5/2007 | Lord et al. | |
| 2008/0257602 A1 | 10/2008 | Wagener | |
| 2011/0038103 A1 * | 2/2011 | Hudgins, Jr. | H02B 1/21 361/637 |

OTHER PUBLICATIONS

Siemens Sinamics S120 papers titled "*Modular, High-Performance Drive System for Single or Multi-Axis Applications*" dated Jan. 27, 2011, pp. 1 & 8.
Phoenix Contact's catalog pages titled "*PCB connector—ZEC 1,5/10-5,0-LPV—1898347*" dated Jan. 13, 2013 pp. 1-4.
Phoenix Contact's online catalog pages titled "*ZEC 1,5/ 6-LPV-5,0 C2*" dated Mar. 12, 2010 pp. 1-4.
Phoenix Contact's online catalog pages titled "*Printed-circuit board connector—ZEC 1.5/11-ST-5.0 C2 R1.11—1883132*" dated Oct. 30, 2012 pp. 1-5.
Phoenix Contact's pages titled "*COMBICON Direct Plug Connectors ZEC 1 and ZEC 1,5 3.5 / 5.0 and 7.5 mm Pitch*" date unknown pp. 1-7.
Siemens Sinamics S120 paper titled "*Modular, High-Performance Drive System for Single or Multi-Axis Applications*" dated Jan. 27, 2011 pp. 1-24.
Extended European Search Report dated Nov. 7, 2013 for Application No. EP 13 18 0432.

* cited by examiner

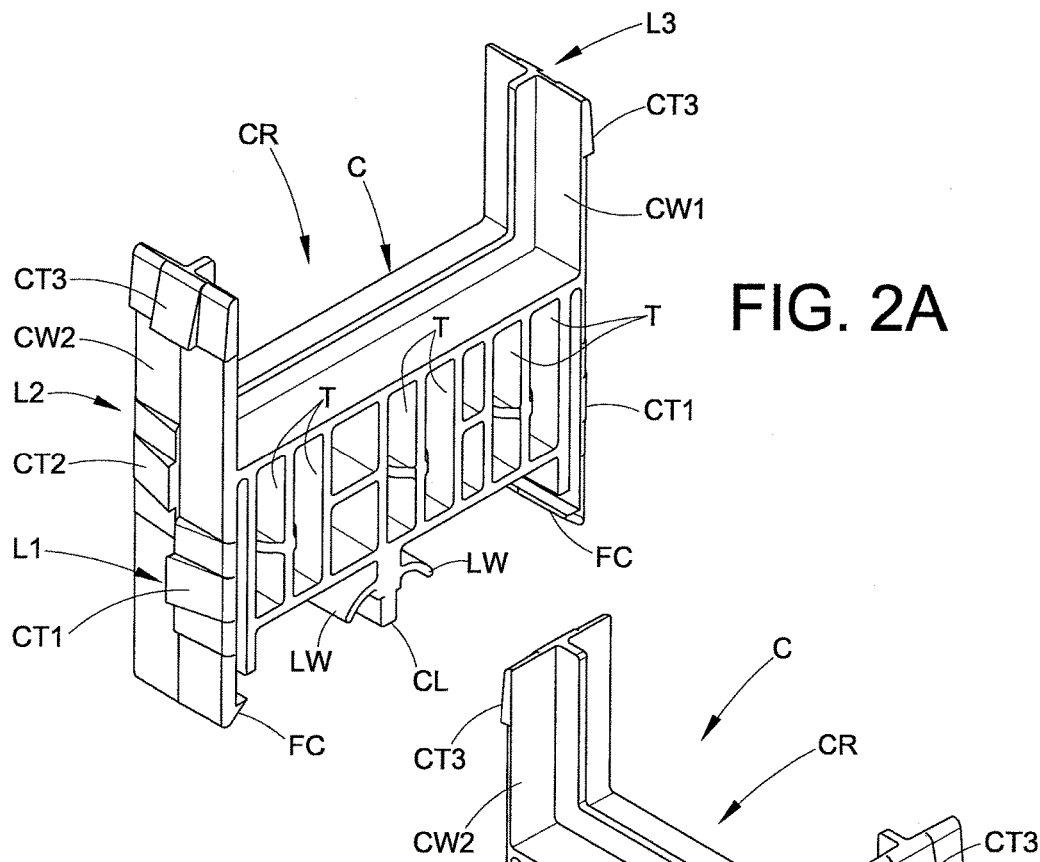
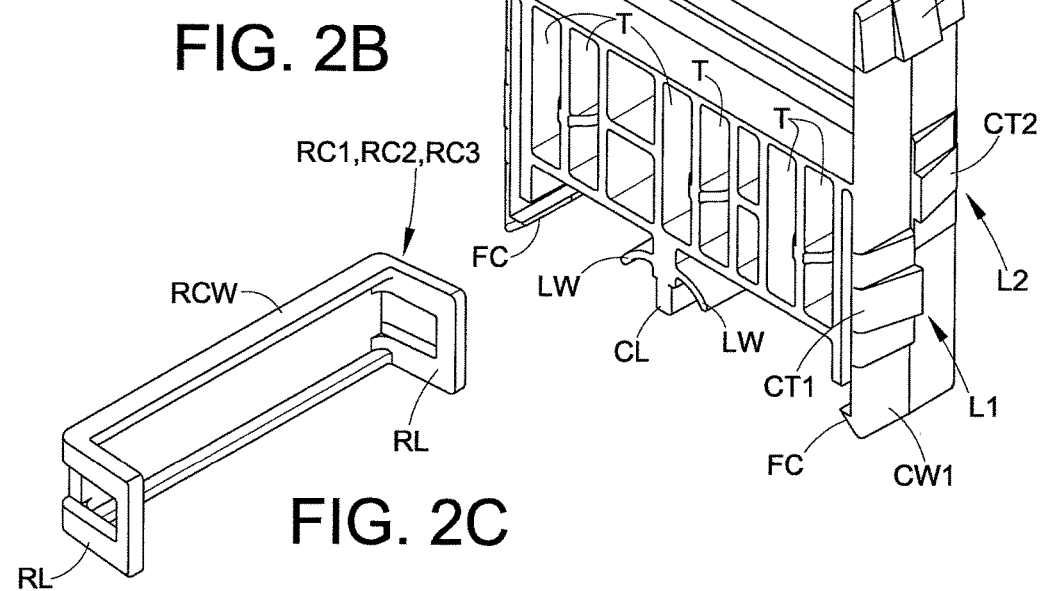

MULTI-DRIVE COMMON CONTROL BUS CONNECTOR SYSTEM

CROSS-REFERENCE TO RELATED APPLICATIONS

This application is a continuation of U.S. application Ser. No. 13/965,766 filed Aug. 13, 2013, now assigned U.S. Pat. No. 9,558,864 which claims priority from and benefit of the filing date of U.S. provisional application Ser. No. 61/683,197 filed Aug. 14, 2012, and the entire disclosure of each of said prior applications is hereby expressly incorporated by reference into the present specification.

BACKGROUND INFORMATION

Known motor drive systems have used a variety of wiring harnesses and connectors to distribute power to and from the drive system modules. Unique connectors have been used depending upon the distance and the voltage of the power to be transmitted, and the particular drive system module to be connected. This has undesirably increased the number of unique connectors required for the system and correspondingly complicates the wiring for manufacturing the drive system components and increases the complexity of installing and servicing the drive system. Accordingly, a need has been identified for a new and improved electrical bus system and a connector system for supplying power to and receiving power from the electrical bus of a motor drive system.

SUMMARY

In accordance with a first aspect of the present development, an electrical bus assembly includes a frame and a plurality of bus bar carriers connected to the frame. The plurality of electrically conductive bus bars are supported relative to the frame by the bus bar carriers, and the bus bars are arranged in parallel spaced-apart relation relative to each other. A first retainer cap is secured to a first one of the plurality of bus bar carriers located adjacent a first end of the frame. A second retainer cap is secured to a second one of the plurality of bus bar carriers located adjacent a second end of the frame. The first and second retainer caps limit axial movement of the bus bars relative to the plurality of carriers sufficiently to prevent escape of the bus bars from the carriers.

In accordance with another aspect of the present development, a bus bar connector is adapted to engage and electrically communicate with a plurality of parallel spaced-apart bus bars. The bus bar connector includes a base and a plurality of bus bar connectors engaged with and located on opposite sides of the base. Each of the bus bar connectors is adapted to engage and electrically connect with a bus bar, and each of the bus bar connectors includes a terminal contact for electrically connecting to an associated wire. A first keeper is secured to the base and captures a first group of the plurality of bus bar connectors adjacent the first side of the base. A second keeper is secured to the base and captures a second group of the plurality of bus bar connectors adjacent the second side of the base.

In accordance with a further aspect of the present development, an electrical bus system includes a first bus bar assembly and a second bus bar assembly, the first and second bus bar assemblies each including a frame, a plurality of bus bar carriers connected to the frame, and a plurality of electrically conductive bus bars supported relative to the frame by the bus bar carriers, the bus bars arranged in parallel spaced-apart relation relative to each other. The electrical bus system further includes a jumper connector assembly electrically connecting the first and second bus bar assemblies. The jumper connector assembly includes a first plurality of jumper connectors respectively engaged with and electrically connected to the plurality of bus bars of the first bus bar assembly. The jumper connector assembly also includes a second plurality of jumper connectors respectively engaged with and electrically connected to the plurality of bus bars of the second bus bar assembly. The jumper connector assembly further includes a plurality of jumper bars each engaged with and electrically connected to a respective one of the first jumper connectors and a respective one of the second jumper connectors.

BRIEF DESCRIPTION OF THE DRAWINGS

FIGS. 2A and 2B are front and rear isometric views of a bus bar carrier component of the bus assembly of FIGS. 1 and 2;

FIG. 2C is an isometric view of a retainer cap portion of the bus bar assembly;

DETAILED DESCRIPTION

Figure 1:
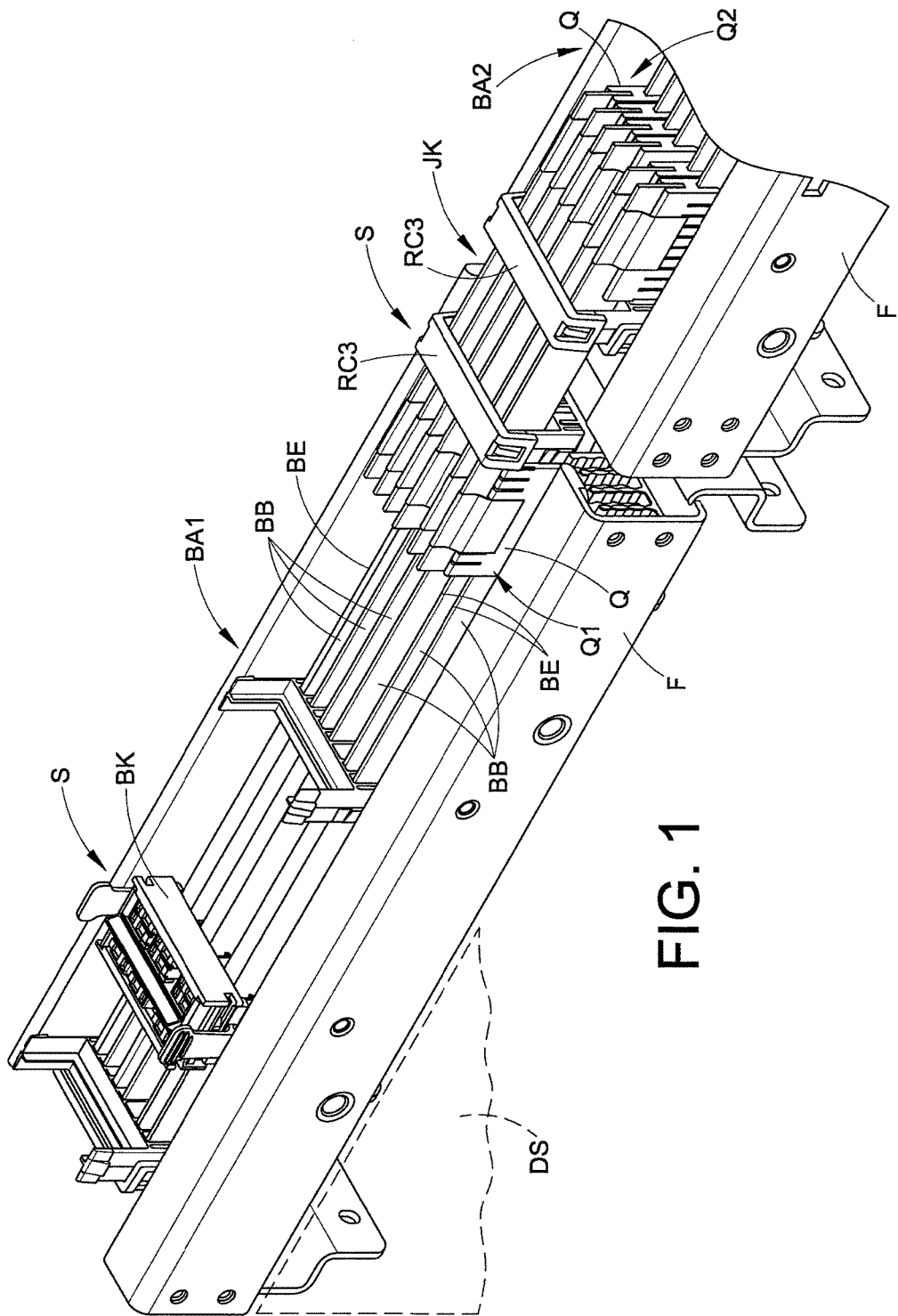
FIG. 1 is an isometric view of an electrical bus system including first and second electrical bus assemblies and a connector system according to the present development.

FIG. 1 is an isometric view of an electrical bus system comprising first and second electrical bus assemblies BA1, BA2 (generally BA) and a connector system S according to the present development. Each bus assembly BA comprises a metal or polymeric base or frame F that is fixedly secured to an associated motor drive system DS or other mounting location. Each bus assembly BA further comprises multiple parallel spaced-apart metallic bus bars BB carried by the frame F and that each conduct electrical power along the axial length of the bus assembly BA. The bus bars BB are arranged in respective parallel planes so as to present a narrow edge BE for being engaged by a bus bar connector according to the present development as described below. Typically, at least some of the bus bars BB conduct different voltages such as 24V, 120V, 240V or others.

Figure 2:
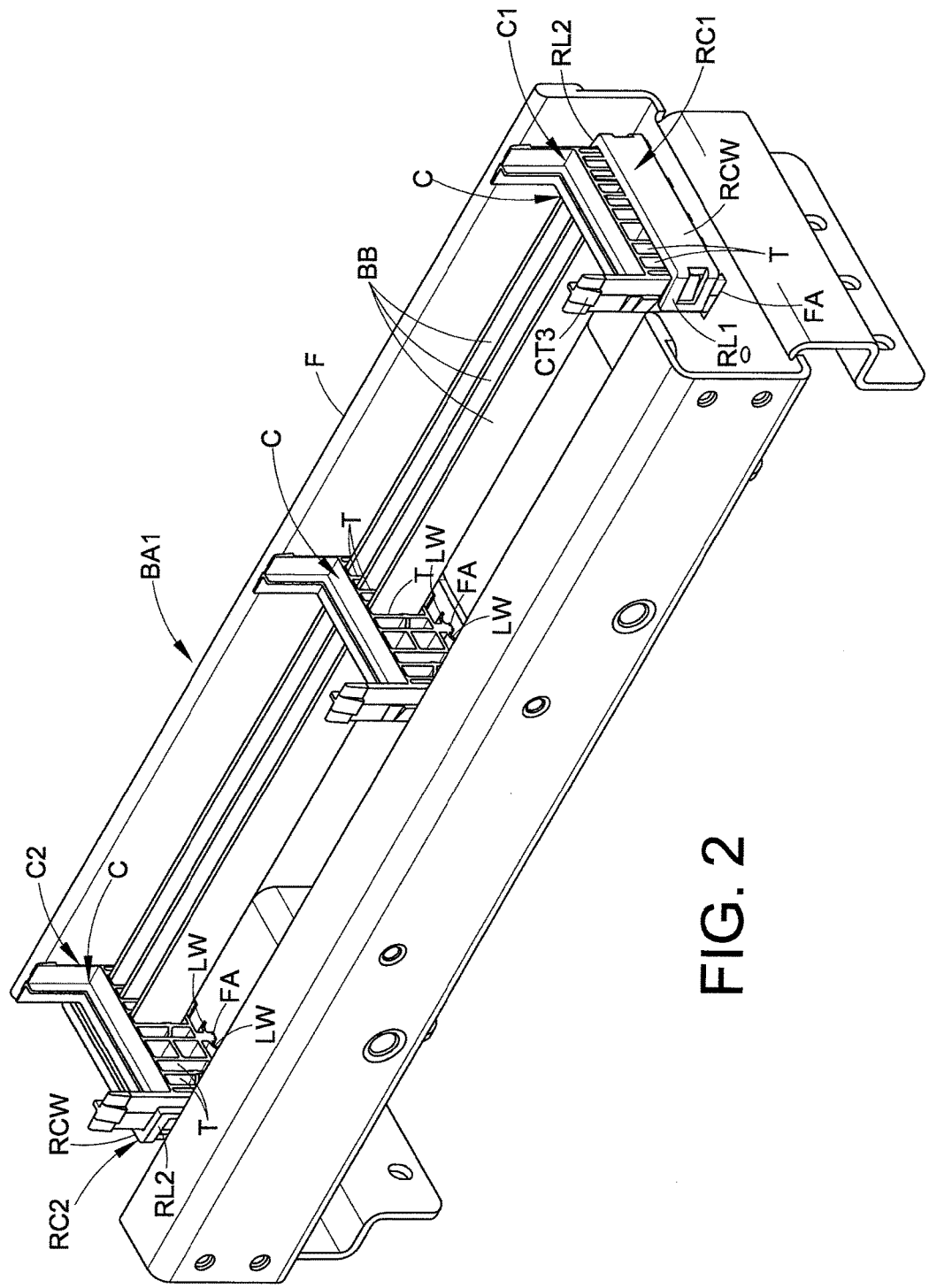
FIG. 2 in an isometric view of a single bus assembly of FIG. 1, with parts thereof removed to reveal additional structures and features of the present development.

FIG. 2 provides an isometric view of the bus assembly BA1 in which some of the bus bars BB have been removed. With reference to both FIGS. 1 and 2, each bus assembly BA further comprises a plurality of polymeric or other electrically insulative bus bar carriers C connected to the frame F and each adapted to receive and retain the bus bars BB in the illustrated parallel spaced-apart relationship relative to the frame F. A single bus bar carrier C is shown separately in FIGS. 2A and 2B. Each bus bar carrier C includes multiple spaced apart slots T that are respectively adapted to receive and support the metal bus bars BB. In the illustrated embodiment, each bus car carrier C includes at least two feet FC that are received and retained by a snap-fit in associated mounting slots or mounting apertures FA defined in the frame F.

Each bus bar carrier C preferably also comprises a projecting leg CL located between first and second ones of said feet FC and comprising first and second resilient wings LW that project outwardly from the leg CL. These wings LW are resilient and they are dimensioned such that when the carrier C is snap-fit to the frame F, the projecting leg CL is received in one of said frame mounting apertures FA and the wings LW resiliently engage frame F to stabilize the bus bar carrier relative to the frame and to bias the carrier C relative to the frame F in an outward direction such that the carrier feet FC are maintained in close contact with the frame F and incidental movement of the carrier C relative to the frame F is minimized. The leg CL and its mating frame mounting aperture can also be offset from a central location and used as a key to ensure that the carriers C are installed in the desired orientation relative to the frame F, i.e., an offset leg CL and corresponding mounting aperture FA will allow the carrier C to mate with the frame F in only a single orientation. Each of the carriers C is identical to the others and can be installed in any carrier mounting location of the frame F.

In the illustrated embodiment, the carrier slots T are closed, i.e., the slots T have a complete periphery that is continuous and uninterrupted, such that a bus bar BB must be slid axially into the slot T through one of the open ends of the slot T. The bus assembly BA comprises first and second bus bar retainer caps RC1,RC2 that capture the bus bars in the carriers C by preventing axial sliding movement of the bus bars relative to the carriers C as required for the bus bars BB to be removed, i.e., the first and second bus bar retainer caps completely prevent axial sliding movement of the bus bars BB relative to the carriers C or at least limit axial sliding movement of the bus bars BB relative to the carriers C to an amount less than that required for the bus bars to escape from the carrier slots T. The retainer caps RC1,RC2 are identical to each other and are interchangeable. The retainer cap RC1 is snap-fit or otherwise releasably fixedly secured to a first carrier C1 located adjacent a first end of the frame F/bus assembly BA, and the retainer cap RC2 is snap-fit or otherwise releasably fixedly secured to a second carrier C2 located adjacent a second end of the frame F/bus assembly BA.

With particular reference to FIGS. 2A & 2B, each of the carriers C includes a first retainer cap mounting location L1 defined by first and second inner ramped engagement teeth CT1 (a first pair of ramped engagement teeth CT1) located respectively on the first and second outer side walls CW1, CW2 of the carrier C and oriented in a first direction to engage and retain one of the retainer caps RC mated therewith on a first side of the carrier C. Each of the carriers C further includes a second retainer cap mounting location L2 defined by first and second middle ramped engagement teeth CT2 (a second pair of ramped engagement teeth CT2) located respectively on the first and second outer side walls CW1,CW2 of the carrier C and oriented in a second direction that is opposite the first direction so as to be adapted to engage and retain one of the retainer caps RC mated therewith on a second side of the carrier C. As best seen in FIG. 2C, the retaining caps RC1,RC2 are identical to each other and each comprise a main wall RCW and first and second resilient legs RL that project outwardly from the main wall and that each include a slot or other structure for mating with either the first pair of ramped engagement teeth CT1 or the second pair of ramped engagement teeth CT2. The retaining caps RC1,RC2 can be disengaged from a carrier C by resiliently spreading the legs RL sufficiently to disengage them from the ramped teeth with which they are respectively engaged.

Each bus bar carrier C further includes a U-shaped or C-shaped open recess CR defined between outwardly projecting ends of the first and second side walls CW1,CW2. Each of the bus bar carriers C further includes a third retainer cap mounting location L3 defined by first and second upper ramped engagement teeth CT3 (a third pair of ramped engagement teeth CT3) located adjacent the outer ends of the opposite first and second outer side walls CW1,CW2 of the carrier C and oriented in a third direction that is transverse to both the first and second directions so as to be adapted to engage and retain a third retainer cap RC3 mated therewith on an upper edge of the carrier C as shown in FIG. 1 so that the third retainer cap RC3 extends between the side walls CW1,CW2 and closes the recess CR. The third retainer cap RC3 is identical to the first and second retainer caps RC1,RC2, and the purpose of the third retainer cap mounting location L3 and the third retainer cap RC3 is explained below.

Referring again particularly to FIG. 1, the connector system S according to the present development comprises at least one of: (i) a bus bar connector assembly BK; and (ii) a jumper connector assembly JK. The bus bar connector assembly BK selectively connects with the bus bars BB of a bus assembly BA and is used for supplying power to the bus bars BB or is used for drawing power from the bus bars BB. The jumper connector assembly JK connects with and provides an electrical jumper connection between the bus bars BB of both the first and second adjacent bus bar assemblies BA1,BA2.

Figure 3:
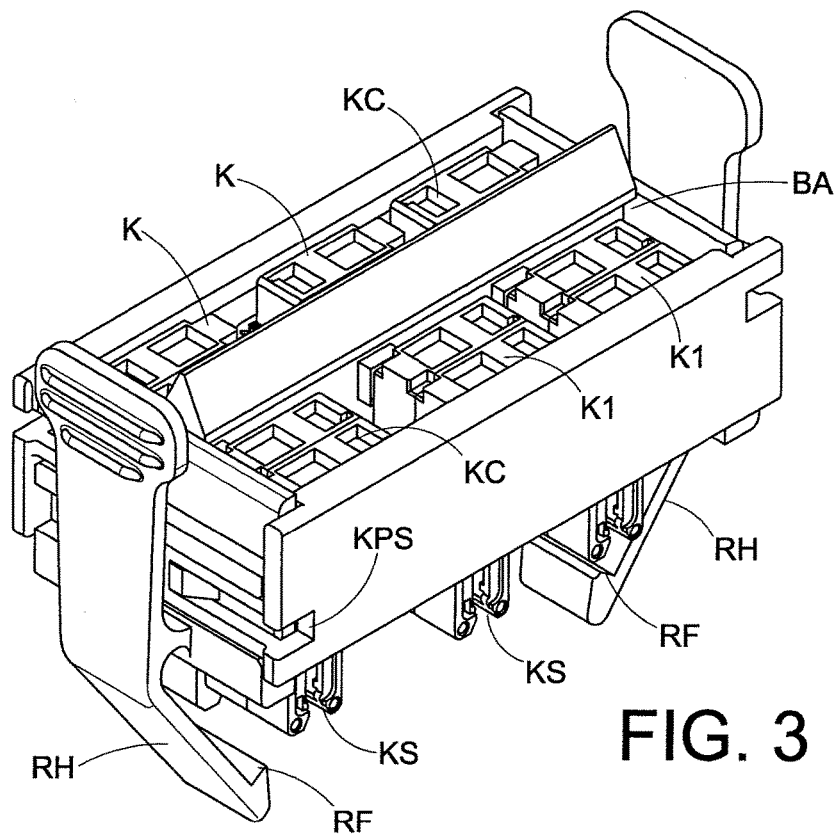
FIGS. 3 and 4 are respective isometric and side views of the bus bar connector assembly used in the system of FIG. 1 to supply power to and to draw power from the electrical bus assembly.
Figure 4:
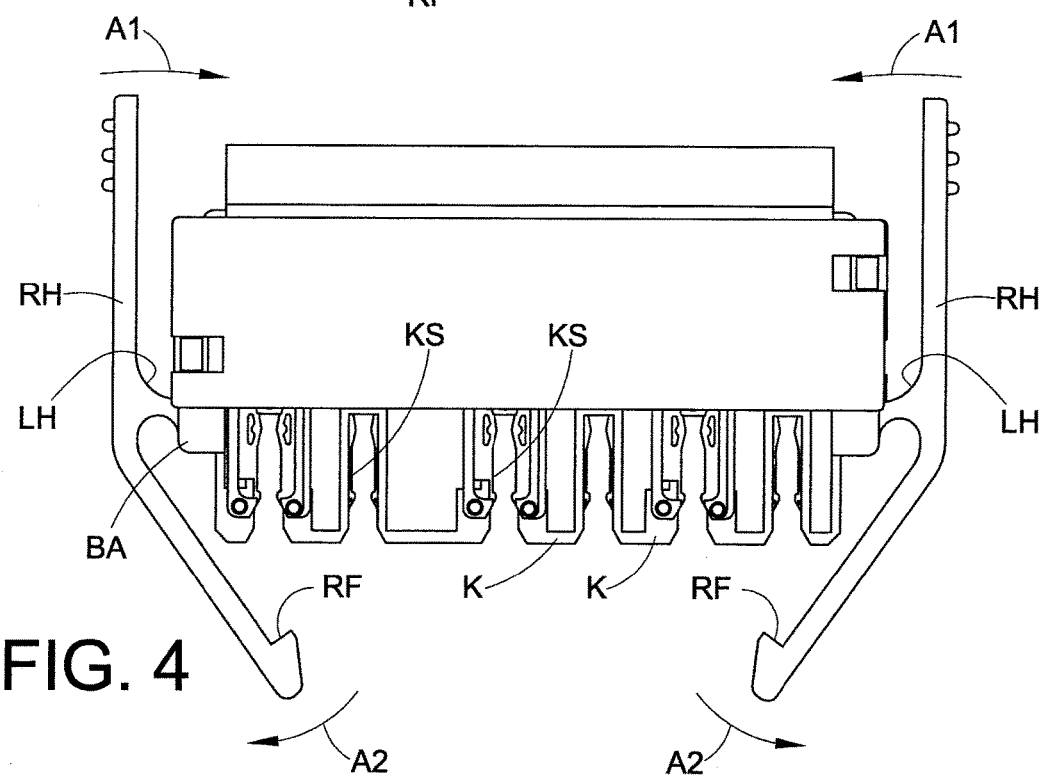

FIGS. 3 and 4 are respective isometric and side views of the bus bar connector BK provided in accordance with the present development. Each bus bar connector BK comprises a base BA and a plurality of bus bar connectors K secured to the base BA. The individual bus bar connectors K each comprises a slot KS for slidably mating with the edge BE of one of the bus bars BB for electrically connecting to the mated bus bar BB. Each connector K also includes one or more cage clamp or other wire retaining terminal contacts KC that are electrically connected to the slot KS such that a wire engaged with a terminal contact KC is electrically connected to a bus bar BB engaged with the slot KS. Connectors suitable for use as connectors K (but not previously known for such use) are available commercially from PHOENIX CONTACT GmbH & Co. KG, Flachsmarktstr. 8, D-32825 Blomberg Germany (www.phoenixcontact.com), known as their Printed Circuit Board Connector—ZEC 1.5/11-ST-5.0 C2 R1.11—1883132 or equivalent (1-position connector version).

Figure 5:
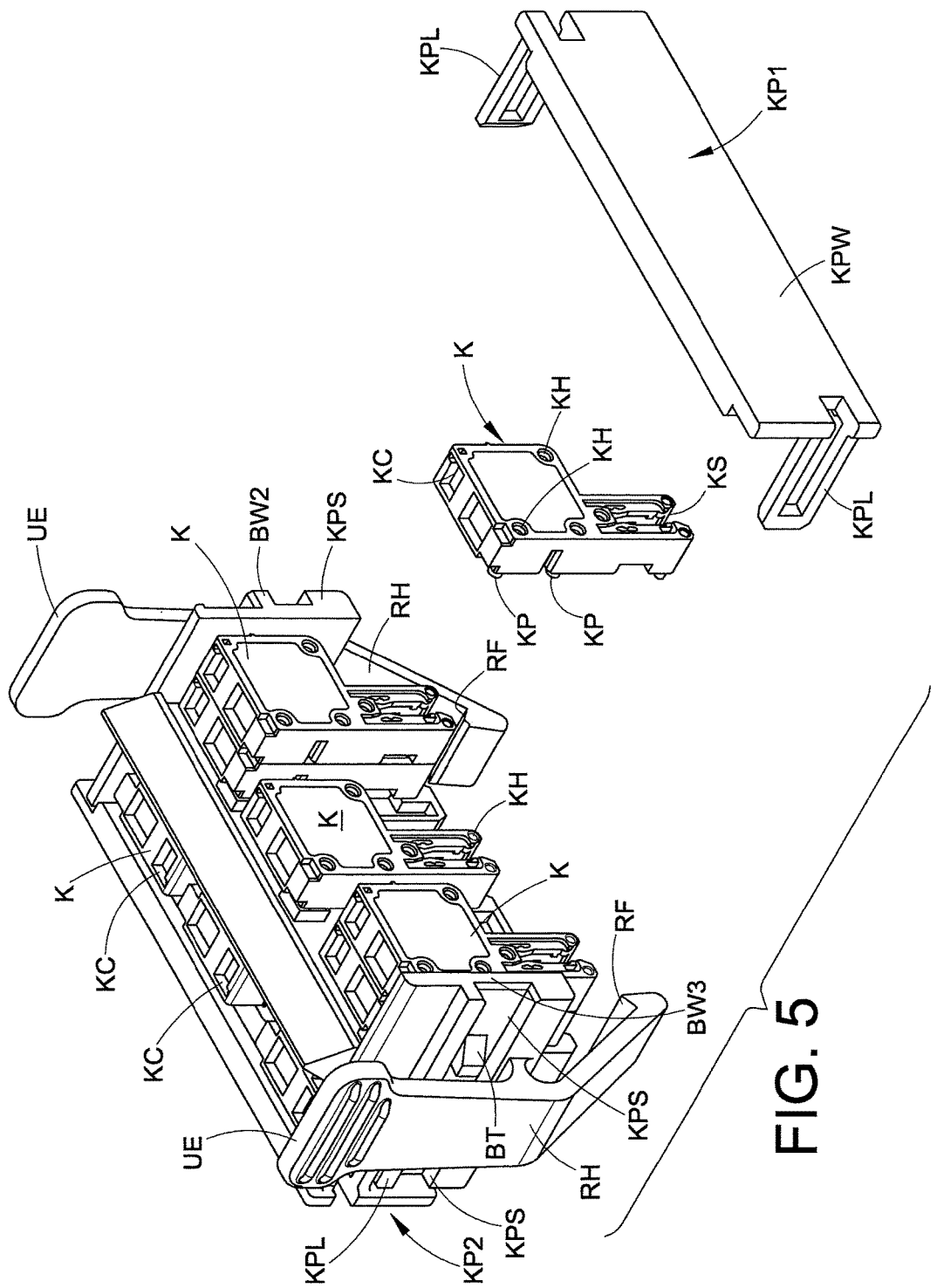
FIG. 5 is an exploded isometric view of the connector shown in FIGS. 3 and 4.
Figure 6:
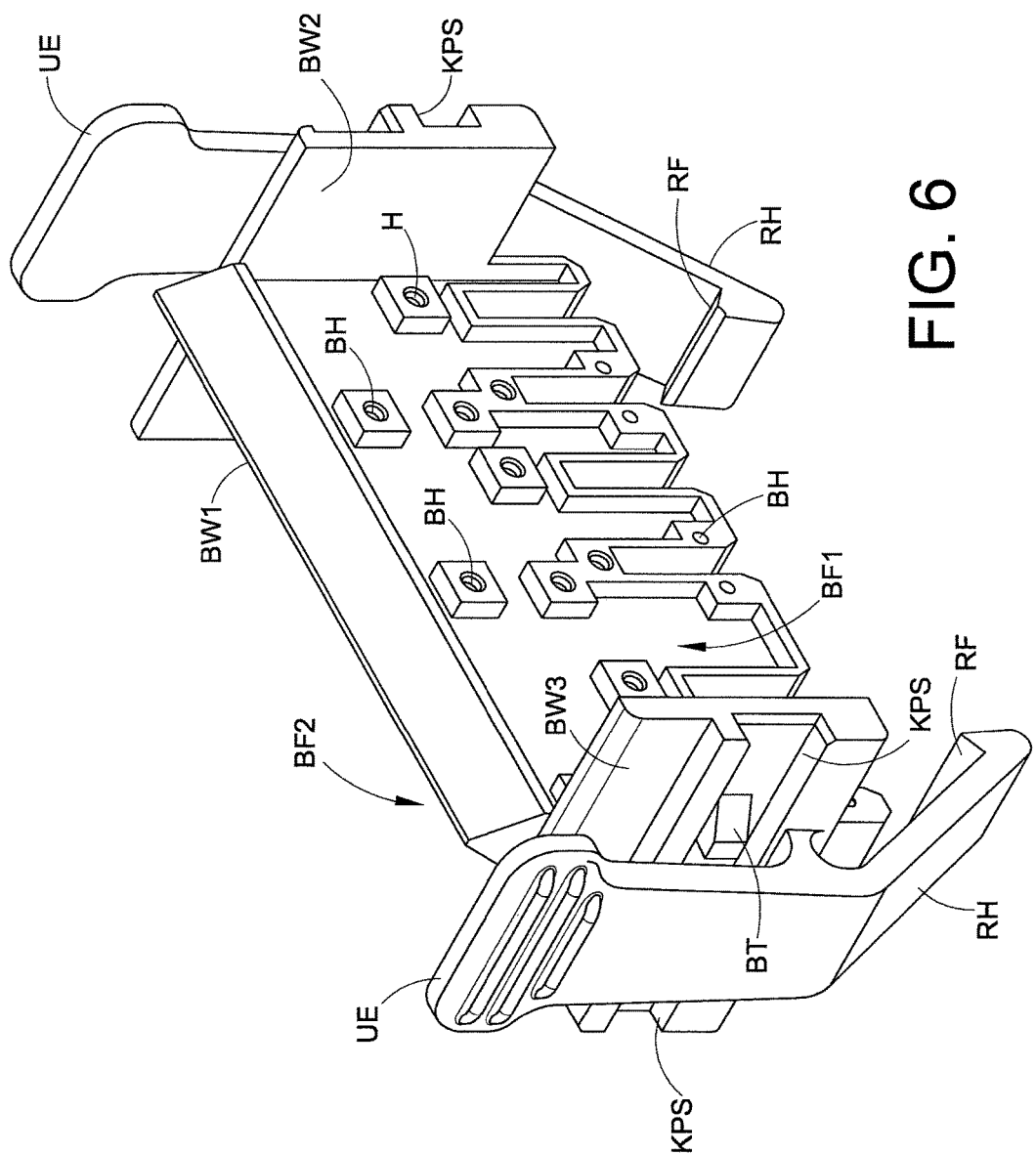
FIG. 6 is an isometric view of a base portion of the connector shown in FIGS. 3 and 4.

As shown separately in FIG. 6, the connector base BA comprises a one-piece polymeric member including a main wall BW1 and first and second parallel spaced-apart end walls BW2,BW3 connected to opposite ends of the main wall BW1. The main wall BW1 comprises opposite first and second faces BF1,BF2. A plurality of apertures or holes BH are defined in each face BF1,BF2 (only the holes BH in the face BF1 are shown, but the face BF2 is similarly to include the holes BH). The holes BH are adapted for receiving mating projections KP (see FIG. 5) that extend from one side of each connector K in order to releasably connect a connector K to the base BA. Each connector K further includes holes KH defined in its opposite face that are also adapted to receive and retain the projections of another connector K such that two connectors K are secured to the base F in a stacked configuration by inserting the projections KP of a first connector K into the holes BH of the base BA and by inserting the projections KP of a second connector K into the holes KH of the first connector as will be apparent to one of ordinary skill in the art as shown in the exploded view of FIG. 5. The connectors K are also commercially available in a "2-position" version, i.e., a single one-piece connector unit that comprises first and second connectors K located adjacent each other, which eliminates the need to stack two individual connectors K together as described above.

The bus bar connector BK further comprises first and second connector keepers KP1,KP2 that are selectively releasably secured to the base BA and that capture the stacked connectors K to the base BA and to each other. Each keeper KP1,KP2 comprises a keeper main wall KPW and first and second resilient keeper legs KPL that project from the keeper main wall KPW. The connector base BA comprises keeper slots KPS that are defined in the opposite end walls BW2,BW3 adapted to slidably receive the keeper legs KPL. The connector base BA further comprises retaining teeth BT located in the keeper slots KPS that engage a slot or detent defined in the keeper legs KPL in order to releasably secure the first and second keepers KP1,KP2 to the base BA. As such, the keeper KP1,KP2 are selectively releasably connected to opposite sides of the base BA. In an alternative embodiment, the connectors K are mounted on only a face BF1,BF2 of the main wall BW1, in which case only one of the keepers KP1,KP2 is required to capture the connectors K to the base BA.

The bus bar connector BK further comprises at least one retainer hook RH connected to the base BA. In the illustrated embodiment, the base BA comprises first and second retainer hooks RH connected thereto. Each retainer hook RH comprises a bus bar engagement foot RF at its distal end that is adapted to resiliently engage a bus bar BB with a snap-fit for capturing the connector K to the bus B. To disconnect the connector BK, the hooks RH are resiliently deflected out of engagement with the bus bars BB by exerting manual force on the projecting outer/upper ends UE thereof to move the upper ends UE toward each other as indicated by the arrows A1 (FIG. 4) and thus resiliently deflect the bus bar engagement feet RF away from each other as indicated by the arrows A2 and out of engagement with the bus bars BB. The retainer hooks RH are preferably defined with the base BA as a one-piece molded polymeric construction with living hinges LH respectively connecting the retainer hooks RH to the main wall BW1. As such, the upper ends UE of the retainer hooks RH can be selectively manually moved toward each other in order to resiliently deflect the bus bar engagement feet RF outward and out of engagement with the bus bars BB as described above.

It is preferred that the bus bars BB be spaced non-uniformly relative to each other in the frame F such that the connector BK can be connected to the bus bars BB in only one orientation such that the polarity of the connector BK cannot be accidentally reversed. In other words, the slots KS if the bus bar connectors K will mate with the bus bars BB in only one orientation.

Figure 7:
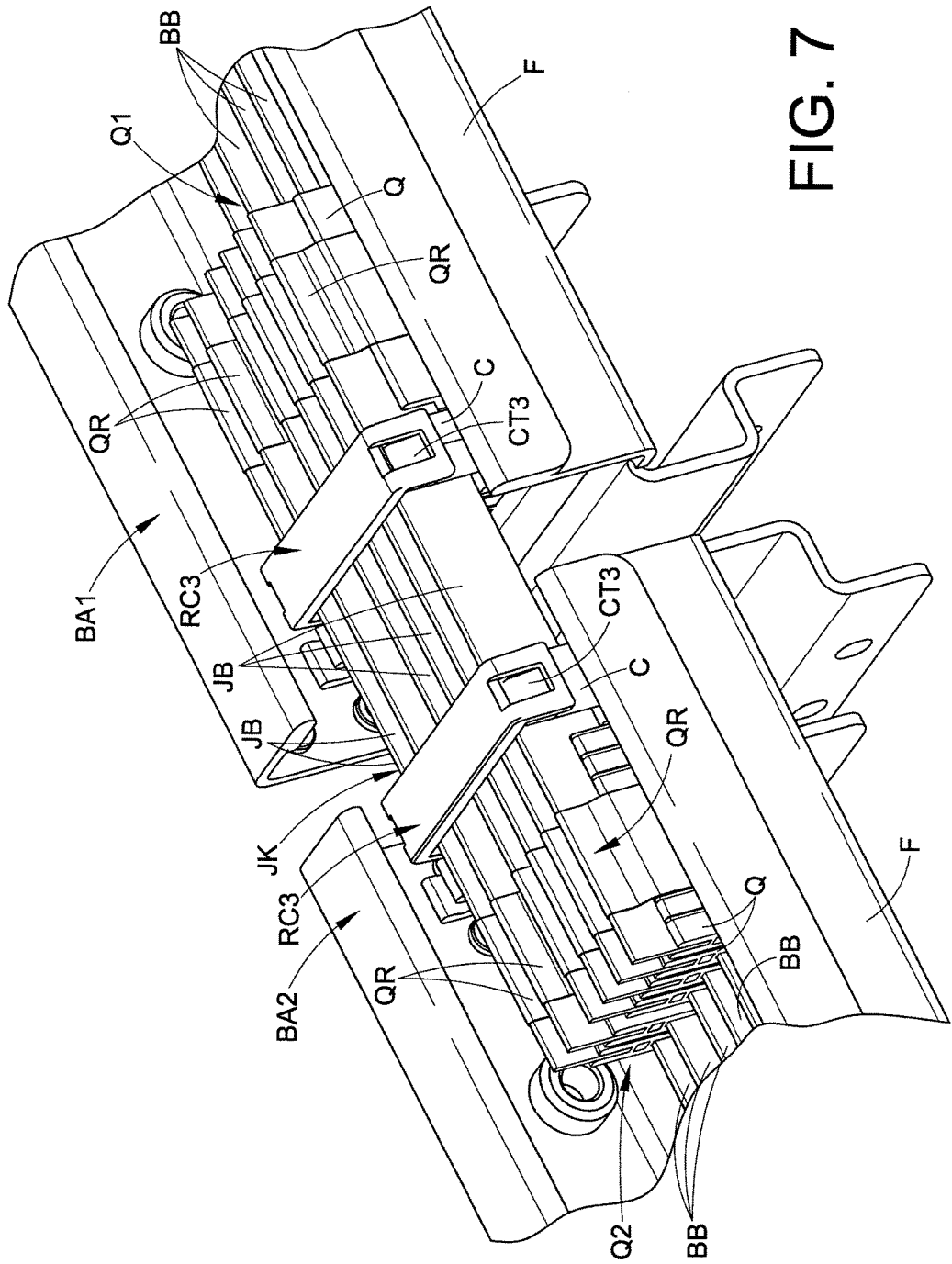
FIG. 7 is an enlarged isometric view of the first and second electrical bus assemblies of FIG. 1, and shows a jumper connector assembly portion of the connector system used for electrically connecting the first and second bus assemblies to each other.

As noted above, the connector system S according to the present development also comprises a jumper connector assembly JK that provides an electrical jumper connection between the bus bars BB of both the first and second adjacent bus bar assemblies BA1,BA2. FIG. 7 is an enlarged isometric view of the first and second electrical bus assemblies of FIG. 1, and shows a jumper connector assembly JK that electrically connects each bus bar BB the first bus assembly BA1 to a respectively corresponding bus bar BB of the second bus assembly BA2. The jumper connector assembly JK comprises a plurality of jumper connectors Q, each of which is connected to a respective bus bar BB. The jumper connector assembly JK further comprises a plurality of metallic electrically conductive jumper bars JB, each of which extend between and electrically connect a pair of the jumper connectors Q. In particular, a first plurality of jumper connectors Q1 are respectively connected to the bus bars BB of the first bus assembly BA1, and a second plurality of jumper connectors Q2 are respectively connected to the bus bars BB of the second bus assembly BA2, and each jumper bar JB electrically connects one of the first group of jumper connectors Q1 to a corresponding one of the second group of jumper connectors Q2.

Figure 8:
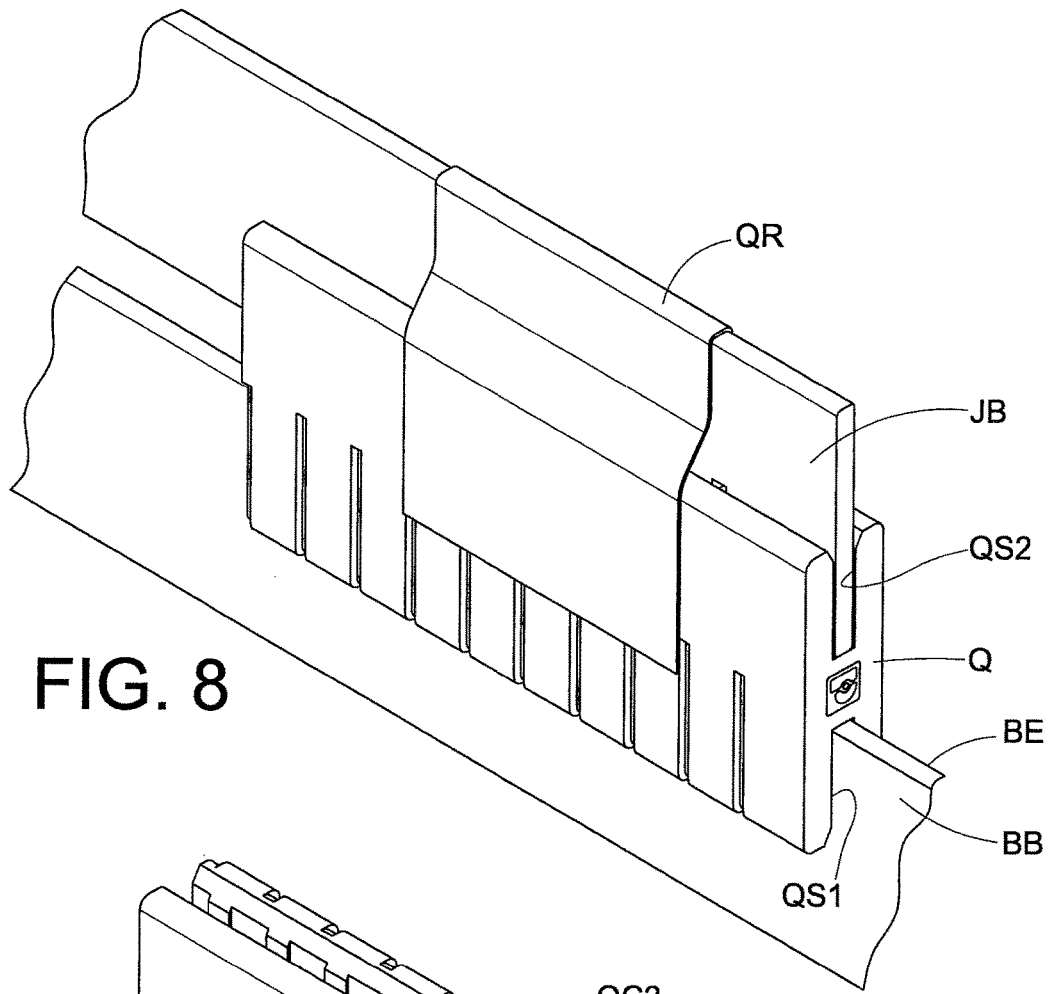
FIG. 8 is an enlarged isometric view of a single jumper connector portion of the jumper connector assembly of FIG. 7 as installed in the system of FIG. 1.
Figure 8A:
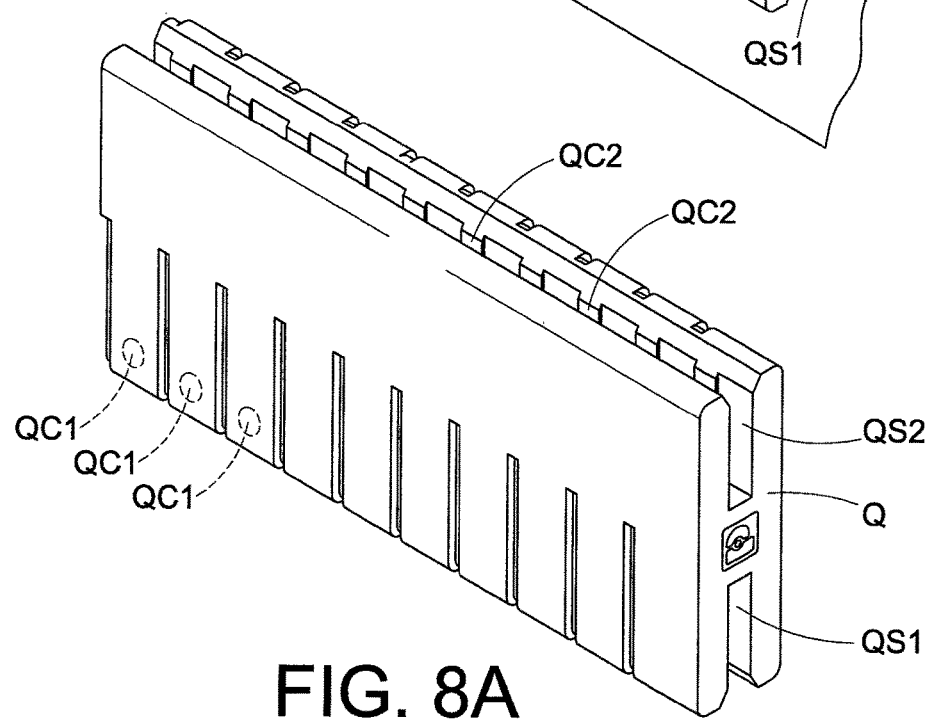
FIG. 8A is an isometric view that shows the jumper connector of FIG. 8 by itself.

Connectors suitable for use as jumper connectors Q (but not previously known for such use) are available commercially from PHOENIX CONTACT GmbH & Co. KG, Flachsmarktstr. 8, D-32825 Blomberg Germany (www.phoenixcontact.com), known as their Printed Circuit Board Connector (PCB)—ZEC 1.5/10-5.0-LPV—1898347 or equivalent (10-position connector version). FIGS. 8 and 8A show that each jumper connector Q comprises a molded polymeric body comprising a first or bus bar connection slot QS1 that is adapted to mate with the edge BE of a bus bar BB and receive the bus bar therein. Each jumper connector Q further comprises a second or jumper bar slot QS2 that is adapted to mate with and receive one of the jumper bars B. The first and second slots QS1,QS2 comprise respective electrical contacts QC1,QC2 therein, and the contacts QC1, QC2 of the first and second slots are electrically connected to each other such that the bus bar BB located in the first slot QS1 is electrically connected to the jumper bar JB located in the second slot QS2. Each jumper connector Q of the first group Q1 is electrically connected to a bus bar BB of the first bus assembly BA1, and each jumper connector Q of the second group Q2 is electrically connected to a bus bar BB of the second bus assembly BA2. Each jumper bar JB is electrically connected to one of the first group of jumper connectors Q1 and one of the second group of jumper connectors Q2 so as to conduct electrical power between the jumper connectors Q and bus bars BB to which it is electrically connected.

The jumper connector assembly JK also comprises tape segments QR that are releasably engaged with the jumper connecters Q and that retain the jumper bars JB in the second slot QS2 during assembly and/or repair. In the illustrated embodiment, the tape segments comprise a high-temperature, electrically insulative tape such as KAPTON® tapes are made from polyimide film with silicone adhesive, but other suitable tapes can alternatively be used.

The jumper connector assembly JK is retained in its operative position by being engaged with a first bus bar carrier C1 located at a first end of the first bus assembly BA1 and with a second bus bar carrier C2 located at a second end of the second bus assembly BA2. In particular, the jumper bars JB are located in the recess CR (see also FIG. 2) defined between the opposite first and second side walls CW1,CW2 of the first and second bus bar carriers C1,C2. First and second jumper bar retainer caps RC3 are respectively connected to the third retainer cap mounting locations L3 of the first and second bus bar carriers C1,C2 to capture the jumper bars JB to the first and second carriers C1,C2. The captured jumper bars JB, in turn, maintain the jumper connectors Q in contact with bus bars BB so that the entire jumper connector assembly JK is retained in its operative position by the first and second retainer clips RC3.

The development has been described with reference to preferred embodiments. Those of ordinary skill in the art will recognize that modifications and alterations to the preferred embodiments are possible. The disclosed preferred embodiments are not intended to limit the scope of the claims, which are to be construed as broadly as legally possible, whether literally or according to the doctrine of equivalents.

The invention claimed is:

1. A bus bar connector assembly adapted for connecting with and communicating electrical power to or from associated bus bars, said bus bar connector assembly comprising:
   a one-piece molded polymeric base, said base comprising: (i) a main wall including opposite first and second faces; and (ii) first and second parallel spaced-apart end walls connected to opposite ends of the main wall;
   a plurality of bus bar connectors releasably engaged with said base on opposite sides of said main wall and abutted with said first and second faces of said main wall, each of said bus bar connectors adapted to engage and electrically connect with one of the associated bus bars, and each of said bus bar connectors comprising a terminal contact for electrically connecting to an associated wire; and
   first and second keepers secured to said base and respectively capturing said plurality of bus bar connectors adjacent said first and second opposite sides of said main wall, said first and second keepers each comprising: (i) a keeper main wall; and (ii) first and second legs that project from the keeper main wall;
   wherein said base further comprises keeper slots defined in the opposite first and second end walls of the base, wherein said keeper slots slidably receive the first and second legs of the first and second keepers.

2. The bus bar connector assembly as set forth in claim 1, wherein each keeper slot comprises a respective retaining tooth located therein, and wherein said first and second legs of each of the first and second keepers includes a detent that is engaged by a respective retaining tooth to releasably secure the first and second keepers to the base.

3. The bus bar connector assembly as set forth in claim 1, further comprising:
   at least one retainer hook connected to said base and comprising a bus bar engagement foot adapted to be engaged with one of the associated bus bars for securing said bus bar connector in engagement with the associated bus bars.

4. The bus bar connector assembly as set forth in claim 3, wherein said one-piece molded polymeric structure of said base comprises said at least one retainer hook.

5. The bus bar connector assembly as set forth in claim 4, wherein said at least one retainer hook comprises first and second retainer hooks, said first and second retainer hooks comprising respective bus bar engagement feet that are adapted to be respectively engaged with first and second ones of associated bus bars.

6. The bus bar connector assembly as set forth in claim 5, wherein the first and second retainer hooks comprise respective upper ends that are selectively manually deflectable toward each other to move the respective bus bar engagement feet outwardly away from each other to disengage said first and second retainer hooks from the first and second associated bus bar.

7. A bus bar connector assembly adapted for connecting with and communicating electrical power to or from associated bus bars, said bus bar connector assembly comprising:
   a one-piece molded polymeric base;
   a plurality of bus bar connectors releasably engaged with said base, each of said bus bar connectors adapted to engage and electrically connect with one of the associated bus bars, and each of said bus bar connectors comprising a terminal contact for electrically connecting to an associated wire;
   a first keeper secured to said base and capturing said plurality of bus bar connectors to a first side of said base;
   wherein said one-piece base comprises first and second retainer hooks, said first and second retaining hooks comprising: (i) respective bus bar engagement feet that are adapted to be respectively engaged with first and second ones of the associated bus bars; and, (ii) respective upper ends that are selectively manually deflectable toward each other to move the respective bus bar engagement feet outwardly away from each other to disengage said first and second retainer hooks from the first and second associated bus bar; and,
   wherein said first and second retainer hooks are connected to the main wall of the base by respective living hinges defined as part of said one-piece molded polymeric structure of said base.

8. The bus bar connector assembly as set forth in claim 7, wherein said base comprises:
   a main wall; and
   first and second parallel spaced-apart end walls connected to opposite ends of the main wall;
   said main wall comprising opposite first and second faces.

9. The bus bar connector assembly as set forth in claim 8, wherein:
   said plurality of bus bar connectors are located on first and second opposite sides of said main wall and in abutment with said opposite first and second faces of said main wall.

10. The bus bar connector assembly as set forth in claim 9, further comprising a second keeper connected to said base, wherein said first and second keepers respectively capture said plurality of bus bar connectors adjacent said first and second opposite sides of said main wall.

11. The bus bar connector assembly as set forth in claim 10, wherein said first and second keepers each comprise:
   a keeper main wall;
   first and second keeper legs that project from the keeper main wall.

12. A bus bar connector adapted to engage and electrically communicate with a plurality of associated parallel spaced-apart bus bars, said bus bar connector comprising:
   a one-piece polymeric base;
   a plurality of bus bar connectors engaged with said base, each of said bus bar connectors adapted to engage and electrically connect with one of the associated bus bars, and each of said bus bar connectors comprising a terminal contact for electrically connecting to an associated wire,
   first and second retainer hooks formed as part of said one-piece polymeric base, said first and second retainer hooks comprising: (i) respective bus bar engagement feet that are adapted to be engaged with first and second ones of the associated bus bars, respectively, said first and second bus bar engagement feet selectively resiliently deflectable away from each other; and (ii) respective upper ends that are selectively manually deflectable toward each other to move the respective bus bar engagement feet outwardly away from each other to disengage said first and second retainer hooks from the respective first and second associated bus bars.

* * * * *